United States Patent [19]

Miau et al.

[11] Patent Number: 5,289,726
[45] Date of Patent: Mar. 1, 1994

[54] RING TYPE VORTEX FLOWMETER AND METHOD FOR MEASURING FLOW SPEED AND FLOW RATE USING SAID RING TYPE VORTEX FLOWMETER

[75] Inventors: Jiun-Jih Miau; En-Gie Chiu, both of Tainan; Jung-Hua Chou, Shinchu; Tzu-Liang Chen, Tainan, all of Taiwan

[73] Assignee: National Science Council, Taipei, Taiwan

[21] Appl. No.: 949,108

[22] Filed: Sep. 22, 1992

[51] Int. Cl.⁵ .............................................. G01F 1/32
[52] U.S. Cl. ................................................. 73/861.22
[58] Field of Search ............ 73/861.22, 861.23, 861.24

[56] References Cited
U.S. PATENT DOCUMENTS 3,927,564 12/1975 Ketelsen ...................... 73/861.22
4,984,470 1/1991 Hayward ...................... 73/861.22

*Primary Examiner*—Herbert Goldstein
*Attorney, Agent, or Firm*—Marshall & Melhorn

[57] ABSTRACT

A vortex flowmeter which is capable of measuring flow speed and flow rate both rapidly and precisely. The vortex flowmeter is composed of a ring-type bluff body situated in a pipe as a vortex shedder. The ring is bevelled at an acute angle at the inner and outer edges of the ring and the vortex shedding frequencies generated by the ring can be transformed to flow speeds and flow rates. The geometrical parameters $G/W$ and $\overline{D}/W$ of the ring are $G/W = 0.50$ to $0.53$ and $\overline{D}/W = 5.03$ to $10.63$, where $G$ denotes the gap width between the outer edge of the ring and the pipe wall, $W$ denotes the width of the ring, and $\overline{D}$ denotes the mean diameter of the ring. After these vortex shedding frequencies are nondimensionalized, they show a relationship with the Reynolds Numbers. The optimal streamwise location for installation of a pressure sensor is in the region of $X/W = 2.25$ to $2.84$, where $X$ denotes the axial distance from the leading surface of the ring frontal surface. The vortex shedding frequencies of the ring can be obtained from the wall pressure measurement. In addition, the present invention also provides a method that uses the vortex flowmeter to measure flow speed and flow rate.

18 Claims, 18 Drawing Sheets

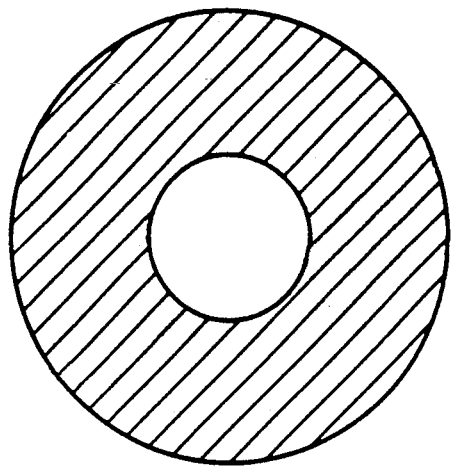
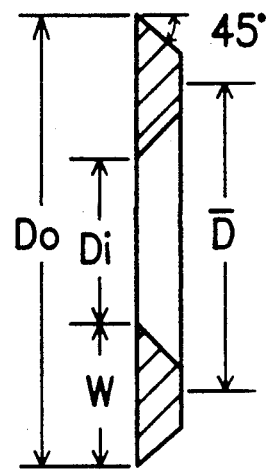
FIG. 1    FIG. 2
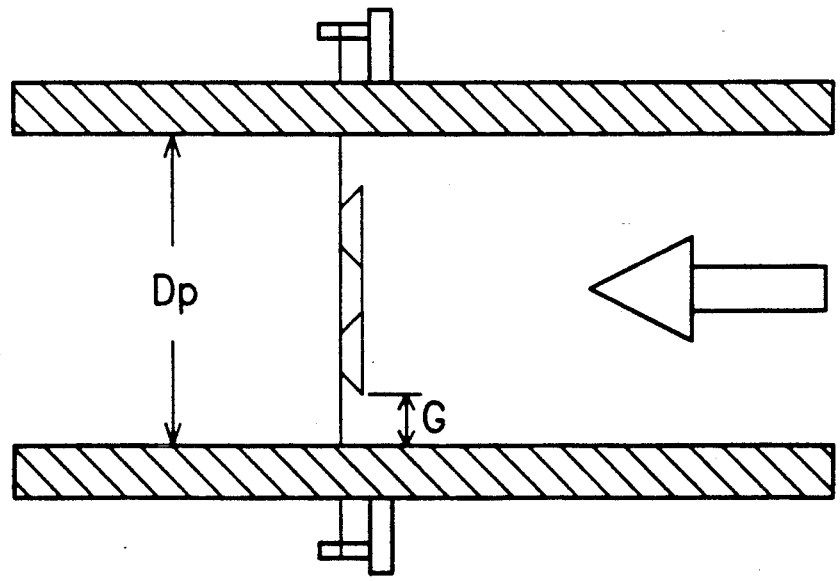
FIG. 3

FIG. 17b (a) $t/T = 0$ (b) $t/T = 3/15$ (c) $t/T = 6/15$ (d) $t/T = 9/15$

RING TYPE VORTEX FLOWMETER AND METHOD FOR MEASURING FLOW SPEED AND FLOW RATE USING SAID RING TYPE VORTEX FLOWMETER

BACKGROUND OF THE INVENTION

The present invention relates to a vortex flowmeter, and in particular to a vortex flowmeter that is capable of measuring flow speed and flow rate both rapidly and precisely.

While the vortex flowmeters available commercially are designed with strut-type vortex shedders, [refer to H. V. Mangin, Tappi, 58(5), 65(1975); T. J. S. Brain and R. W. W. Scott, J. Phys. E: Sci, Instrum., 15, 967(1982); and C. L. Smith, Chemical Engineering, 85, 155(1978)] researchers in this area are aware that a possible design of the vortex flowmeters is to consider the axisymmetric-type bluff bodies as vortex shedders. A pioneering work along this direction is due to Takamoto and Komiya (refer to Takamoto, M. and Komiya, K. "A Vortex Ring Shedding Flowmeter", Bulletin National Research Lab. Metrology, Vol.32, pp.125-134, 1983) who studied the phenomenon of vortex shedding of a ring situated in a free flow and in a circular pipe respectively. They found that for certain sizes of rings situated in the pipe, the quality of the vortex shedding signal obtained can be superior to that obtained behind the strut-type bluff body. They further suggested that a ring-type vortex flowmeter can be designed with a hot-wire of 10 μm in diameter spanning between the inner edge of the ring to sense the periodic velocity fluctuations.

Cousins et al. [refer to T. Cousins, A. J. T. Hayward, and R. Scott, Flow Measurement FLOMEKO, the 5th International IMEKO-Conference on Flow Measurement FLOMEKO, VDI BERICHTE 768, 151 (1989)] proposed a design for a vortex flowmeter that has two rings in tandem arrangement. They compared four types of ring models, based on a number of criteria to evaluate the quality of the velocity signal measured. The vortex shedding frequency was reduced from the velocity signals obtained by a hot-wire probe situated in the flow field.

Miau and Liu [refer to Miau, J. J. and Liu, T. W. "Vortex Flowmeter Designed with Wall Pressure Measurement", Rev. Sci. Instrument 61(10), pp.2676–2681, 1990] proposed a disk-type bluff body as the vortex shedder. They found that the vortex shedding frequency was measureable in the wake of the disk for the geometrical blockage ratio of the disk up to 29.2%. Based on the characteristic velocity and length scales they suggested, the vortex shedding frequencies corresponding to different sizes of disks can be non-dimensionalized into a unified relation. In addition, they pointed out that the advantage of using the axisymmetric vortex shedder is that the vortex shedding frequency can be obtained by wall pressure measurement thus, avoiding the complications involved in the installation of a sensor into the vortex shedder or in the flow field.

The present invention concentrates on the ring-type bluff bodies as the vortex shedders and is somewhat different from the previous studies, that is, the studies suggested by Takamoto and Komiya and Cousins et al. [refer to T. Cousins, A. J. T. Hayward, and R. Scott, Flow Measurement FLOMEKO, the 5th International IMEKO-Conference on Flow Measurement FLOMEKO, VDI BERICHTE 768, 151 (1989)]. The sizes of rings interested in the present work fall in the regime that the process of periodic vortex shedding behind the ring is strongly influenced by the presence of the wall. The interaction between the wake flow of the ring and the presence of the wall is expected to induce wall pressure fluctuations significantly. Thus, similar to Miau and Liu [refer to Miau, J. J. and Liu, T. W. "Vortex Flowmeter Designed with Wall Pressure Measurement", Rev. Sci. Instrument 61(10), pp.2676–2681, 1990], vortex shedding frequency can be obtained with a pressure sensor situated on the wall of the pipe.

SUMMARY OF THE INVENTION

It is an object of the present invention to provide a vortex flowmeter that is capable of measuring flow speed and flow rate both rapidly and precisely.

It is another object of the present invention to provide a method that uses the vortex flowmeter to measure flow speed and flow rate.

In accordance with the objects of the present invention, a vortex flowmeter for measuring flow speed and flow rate in a pipe, comprising (a) means for preparing an axisymmetric bluff body disposed within the pipe with a ring facing incoming flow to induce a vortex shedding frequency, the ring being bevelled at an acute angle at the inner and outer edges of the ring, the geometrical parameters $G/W$ and $\overline{D}/W$ of the ring being selected such that $G/W$ has a value ranging from 0.50 to 0.53 and $\overline{D}/W$ has a value ranging from 5.03 to 10.63, where $G=(D_p-D_o)/2$, $\overline{D}=(D_o+D_i)/2$, $W=(D_o-D_i)/2$, $D_o$ and $D_i$ denoting the diameters of the outer and inner edges of the ring respectively and $D_p$ denoting the diameter of the pipe; (b) means for recording a wall pressure signal induced by the vortex shedding frequency; (c) means for obtaining the vortex shedding frequency from the wall pressure signal; and (d) means for obtaining flow speed and flow rate from the vortex shedding frequency measured through a linear relationship. A method for measuring flow speed and flow rate in a pipe, comprising the following steps of (a) preparing an axisymmetric bluff body disposed within the pipe with a ring facing the incoming flow to induce a vortex shedding frequency, the ring being bevelled at an acute angle at the inner and outer edges of the ring, the geometrical parameters $G/W$ and $\overline{D}/W$ of the ring being selected such that $G/W$ has a value ranging from 0.50 to 0.53 and $\overline{D}/W$ has a value ranging from 5.03 to 10.63, where $G=(D_p-D_o)/2$, $D=(D_o+D_i)/2$, $W=(D_o-D_i)/2$, $D_o$ and $D_i$ denoting the diameters of the outer and inner edges of the ring respectively and $D_p$ denoting the diameter of the pipe; (b) recording a wall pressure signal induced by the vortex shedding frequency; (c) obtaining the vortex shedding frequency from the wall pressure signal; and (d) obtaining flow speed and flow rate from the vortex shedding frequency measured through a linear relationship.

BRIEF DESCRIPTION OF THE DRAWINGS

The present invention can be more fully understood by reference to the following description and accompanying drawings, wherein:

FIG. 1 is an orthographic drawing of a ring model;

FIG. 2 is a side view of the ring model;

FIG. 3 shows a schematic drawing of the ring model in a pipe;

FIG. 17b shows typical segments of the raw velocity signals obtained at 4 cm downstream of the ring at the core of the pipe with Ring 19 at $Re^*=9.0\times10^3$ and Ring 27 at $Re^*=9.0\times10^3$.

DETAILED DESCRIPTION OF THE PREFERRED EMBODIMENTS

As shown in FIG. 1, FIG. 2 and FIG. 3, each of the ring models employed is bevelled at 45° at the inner and outer edges of the ring, with the sharp edge facing the incoming flow. The rings employed can be well described by two geometrical parameters, i.e. the diameters of the inner and outer edges of the rings, denoted as $D_o$ and $D_i$ respectively. These two parameters are further expressed in the non-dimensional form of $G/W$ and $\overline{D}/W$, where $$G=(D_p-D_o)/2 \tag{1}$$

$$\overline{D}=(D_o+D_i)/2 \tag{2}$$

$$W=(D_o-D_i)/2 \tag{3}$$

$D_p$ denotes the diameter of the pipe, which is fixed in the present study. The parameter $G/W$ signifies the gap ratio, characterizing the effect of the presence of the wall, and the parameter $\overline{D}/W$ represents the slenderness ratio of the ring. The geometrical blockage ratio of the ring, called BR, is defined as $$BR=(D_o^2-D_i^2)/D_p^2 \tag{4}$$

A total of 28 rings of different sizes employed in the present study are listed in Table 1.

In the present experiment, Rings 1 to 12 are made of aluminum and Rings 13 to 28 are made of plexiglas. For the aluminum rings, the thickness of each ring model is 7 mm, and for the plexiglas rings the thickness of each ring model is 10 mm. The difference in thickness of these ring models should not have a significant effect on the vortex shedding phenomenon since in the present flow vortex shedding is associated with flow separation due to the sharp edges of the ring.

Experimental Facility

A water tunnel facility was used for the purpose of flow visualization on surveying the wake characteristics of all the ring models employed. The diameter of the test section, $D_p$, is 150 mm. In the test section, the bulk velocity measured, denoted as $U_o$, can reach 60 cm/s. Nevertheless, most of the flow visualization experiments performed in the present experiment were conducted at $U_o=2$ to 3 cm/s, at which high quality photographs of flow motion could be obtained using a 35 mm camera. The corresponding Reynolds numbers based on W and $U_o$ fall in the range of $10^2$ to $10^3$. Flow visualization experiments were carried out with a laser-sheet/fluorescent-dye technique and a conventional dye-injection method. Please refer to Miau et al.(refer to J. J. Miau, E. G. Chiu, and J. H. Chou, "Laser-Sheet Flow Visualization on the Wake Behind a Confined Ring", Accepted by Fluid Dynamics Research) for details of the experimental methods.

Figure 4:
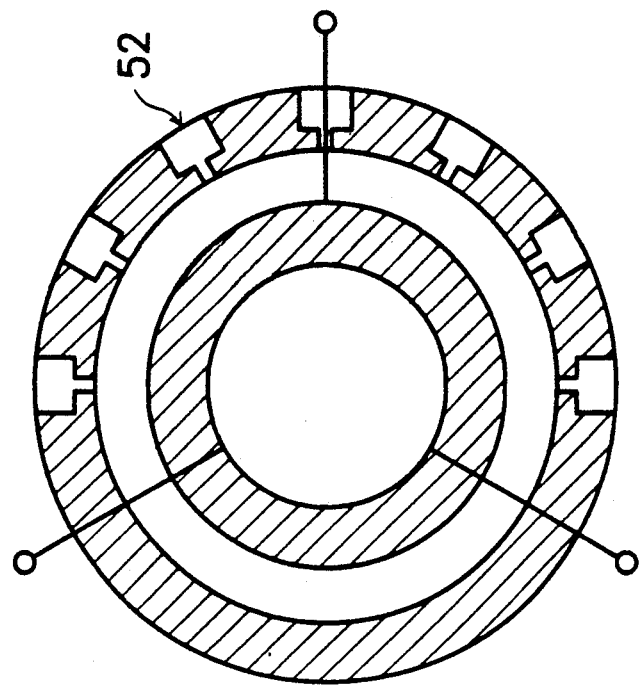
FIG. 4 shows an orthographic drawing of the ring model in a test section.
Figure 5:
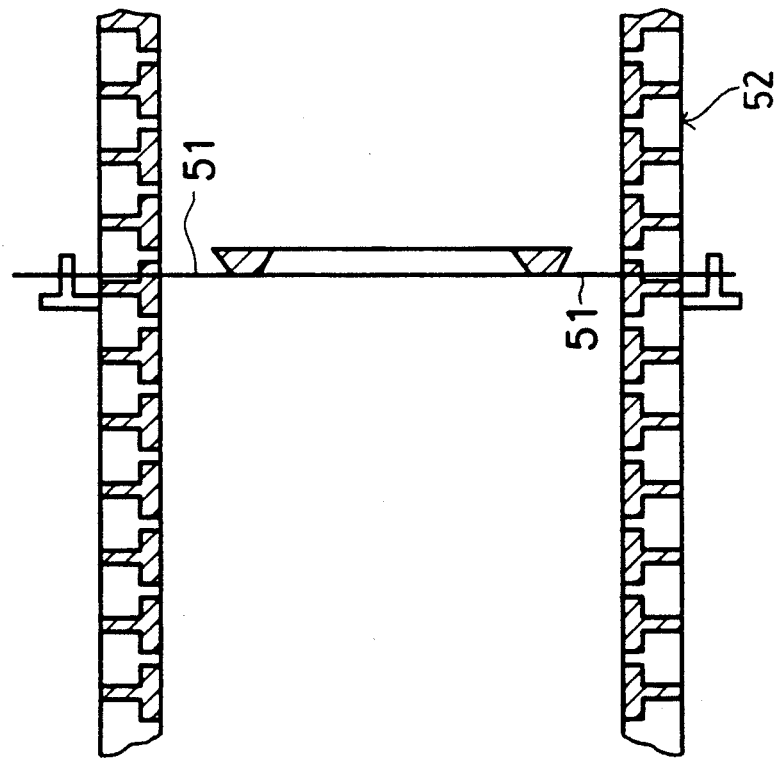
FIG. 5 is a side view of the ring model in the test section.

All the quantitative results present for the present experiment are obtained in an open-type vertical wind tunnel. The diameter of the test section is identical to that of the water tunnel which is 150 mm. Thus, the test section which includes a 450 mm long circular pipe and the ring-type bluff model, as shown in FIG. 4 and FIG. 5, can be easily switched from one facility to the other. The maximum operating velocity measured in the test section of the wind tunnel is 17 m/s, at which the turbulence fluctuation level measured in the core region of the pipe flow is about 0.5 to 0.6% of $U_o$.

As shown in FIG. 4 and FIG. 5, the ring model is held by three stainless steel wires 51 of 0.2 mm in diameter each. Pressure taps 52 are drilled on the wall of the test section for pressure measurements by either a pressure transducer or a microphone.

Figure 6:
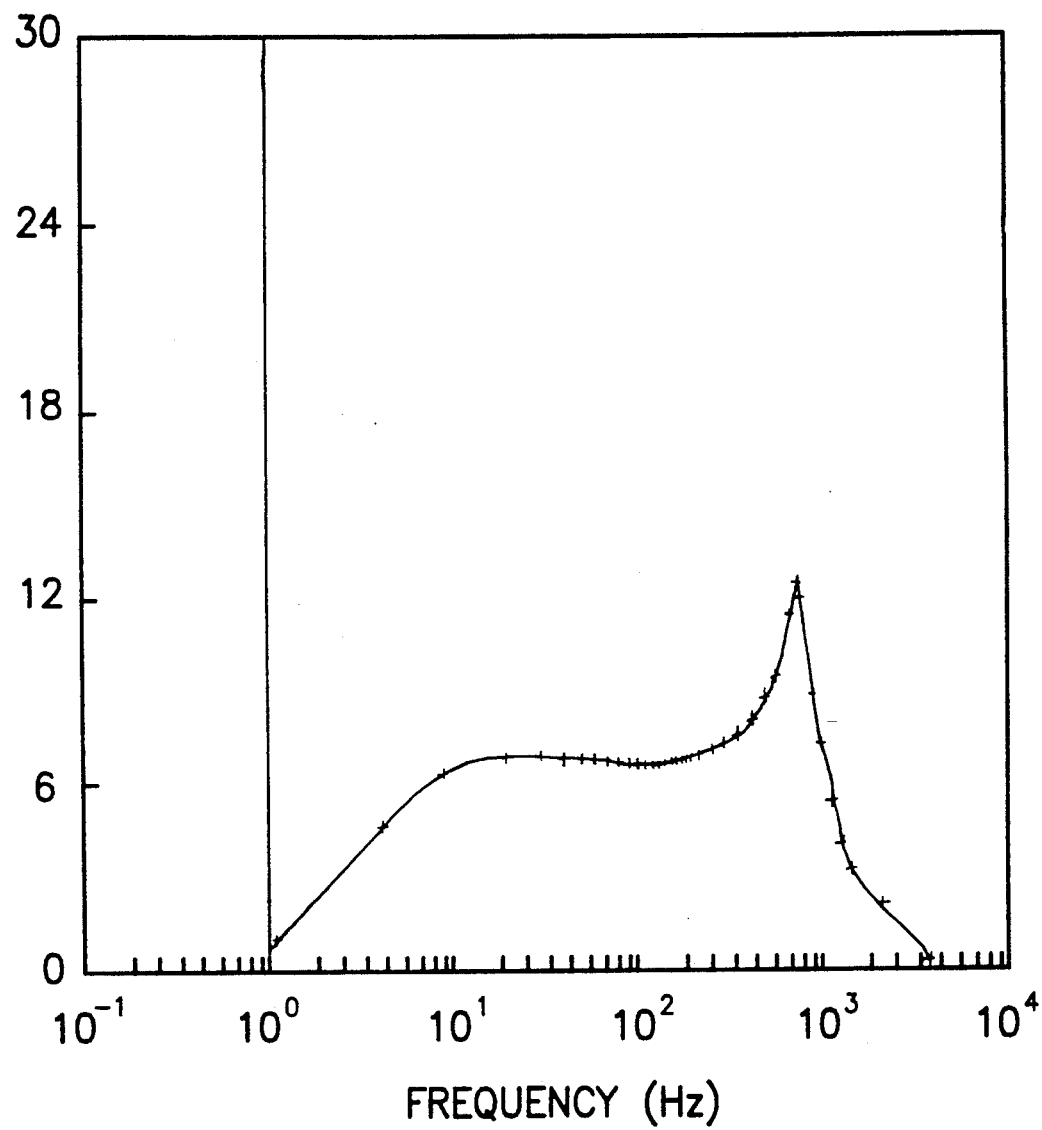
FIG. 6 is the calibration curve of the output voltages of the microphone versus the frequencies of the input pressure fluctuations at a fixed amplitude.

The time-mean pressure distribution on the wall is obtained by a diaphragm-type pressure transducer, Validyne DP-103, and the instantaneous pressure fluctuations are measured by a condensed microphone. The microphone was calibrated with an acoustic calibrator beforehand. This calibrator can generate pressure fluctuations at a fixed amplitude, for which frequency varies from 1 to $2 \times 10^3$ Hz. A set of output voltages of the condensed microphone corresponding to different frequencies of the input pressure fluctuations at a fixed amplitude are shown in FIG. 6. It is seen that the output voltage maintains a constant level in the frequency range of 10 to 200 Hz. By Coincident, the vortex shedding frequencies corresponding to the ring models employed in the wind tunnel experiments fall in the same range where the microphone has a flat response.

Hot-wire anemometers, DANTEC 55M01, were employed to measure the velocity fluctuations in the wake behind the ring. The measured signals were utilized for spectral analysis to obtain the vortex shedding frequencies.

The Regime of Periodic Vortex Shedding Interested

Figure 7:
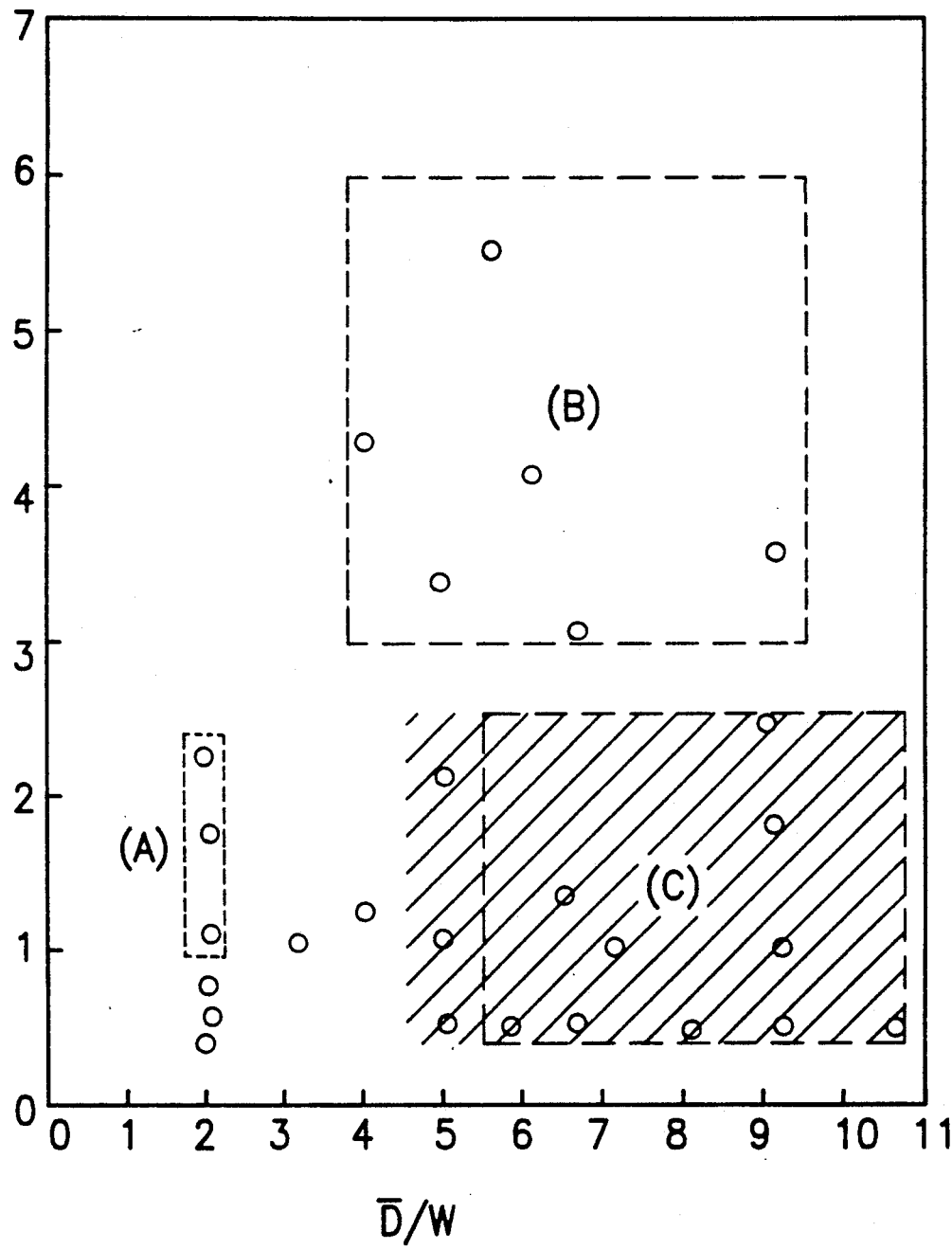
FIG. 7 is the domain of $G/W$ and $\overline{D}/W$ corresponding to 28 ring models studied.
Figure 8A:
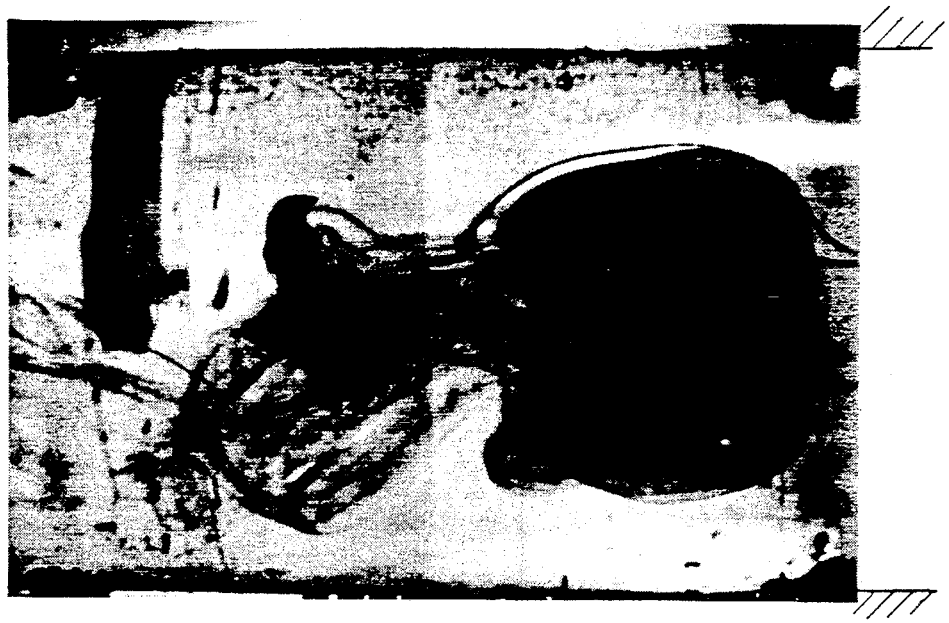
FIG. 8a is the flow visualization photograph obtained in the water-tunnel facility where $(\overline{D}/W, G/W)=(2, 2.25)$ in Regime A and $Re^*=423$.
Figure 8B:
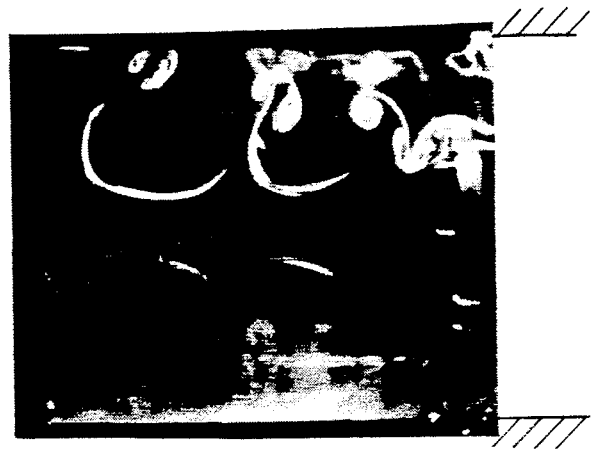
FIG. 8b is the flow visualization photograph obtained in the water-tunnel facility where $(\overline{D}/W, G/W)=(6.10, 4.10)$ in Regime B and $Re^*=222$.
Figure 8C:
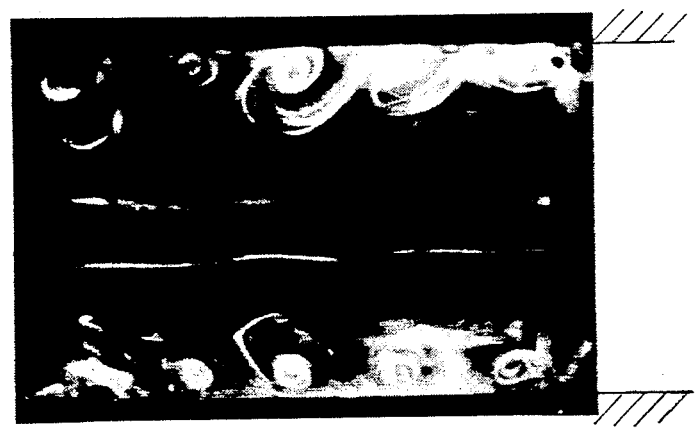
FIG. 8c is the flow visualization photograph obtained in the water-tunnel facility where $(\overline{D}/W, G/W)=(9.20, 0.52)$ in Regime C and $Re^*=342$.

A survey of the wake characteristics corresponding to 25 cases of the 28 rings listed in Table 1 has previously been done by flow visualization. (refer to Miau et al., that is, J. J. Miau, E. G. Chiu, and J. H. Chou, "Laser-Sheet Flow Visualization on the Wake Behind a Confined Ring", Accepted by Fluid Dynamics Research). Important features obtained from the previous study, (refer to Miau et al.), and the flow visualization results of the remaining three ring models marked by * in Table 1 are summarized in the following. In terms of the geometrical parameters of the ring models, there are roughly three regimes A, B, and C, indicated by dash lines in FIG. 7, in which the shedding vortices persist in organized forms for quite a distance downstream of the ring. (1) Regime A: $2 < \overline{D}/W < 2.08$ and $1.1 < G/W < 2.25$. As shown FIG. 8a for a representative flow visualization photograph (refer to Miau et al.). The process of vortex shedding observed is similar to that of a flow over a confined circular disk of low blockage ratio, namely, the wake is characterized by three-dimensional vortex-loop shedding. [refer to Fuchs, H. V., Mercker, E. and Merchel, U. "Large-scale Coherent Structure in the Wake of Axisymmetric Bodies", J. F. M., 1979, Vol.93, pp.185-207 and D. Marshall and T. E. Stanton, Proc. Roy. Soc. London, A130, 295(1931)] (2) Regime B : $4 < \overline{D}/W < 9.29$ and $3.09 < G/W < 5.88$. The flow characteristics are signified by axisymmetric-type vortex rings shedding from the outer and inner edges of the ring model alternately, as shown in FIG. 8b. This appearance is the same as that reported by Takamoto and Izumi [refer to M. Takamoto and K. Izumi, Phys. Fluids, 24(8), 1582(1981)] for a wake behind a ring in free flow. Conceivably, this regime may extend to higher values of G/W where the presence of the wall exerts even less effect on the vortex shedding process. (3) Regime C : $5.82 < \overline{D}/W < 10.63$ and $0.5 < G/W < 2.5$. Strong interaction between the wake behind the ring model and the wall flow is observed, as shown in FIG. 8c. In the development of the wake flow, the vortical structures shed from the inner edge of the ring model, in a form of axisymmetric-type vortex rings, appear to dominate over the vortical structure developed from the outer edge of the ring. This characteristics become more pronounced as the corresponding G/W value decreases. For instance, in the case of Ring 19 with G/W=0.52 shown in FIG. 8c, the vortical structure developed immediately behind the outer edge of the ring appears to play no role in the evolution of the wake flow. On the other hand the vortical structures shed from the inner edge of the ring convect along the surface of the pipe wall (refer to Miau et al.).

The present experiment is intended to facilitate the flow characteristics of Regime C mentioned above in the design of a vortex flowmeter. The main reason is that one would like to obtain the vortex shedding frequency from the wall pressure measurement. The advantage of this consideration, as mentioned earlier, is to relax the specifications of a frequency sensor that needs to be installed outside the flow field. The range of the geometrical parameters studied in this work covers a region which is larger than that of Regime C, and is indicated by the hatched lines in FIG. 7.

Results and Discussion

A. Vortex shedding frequency

Figure 9:
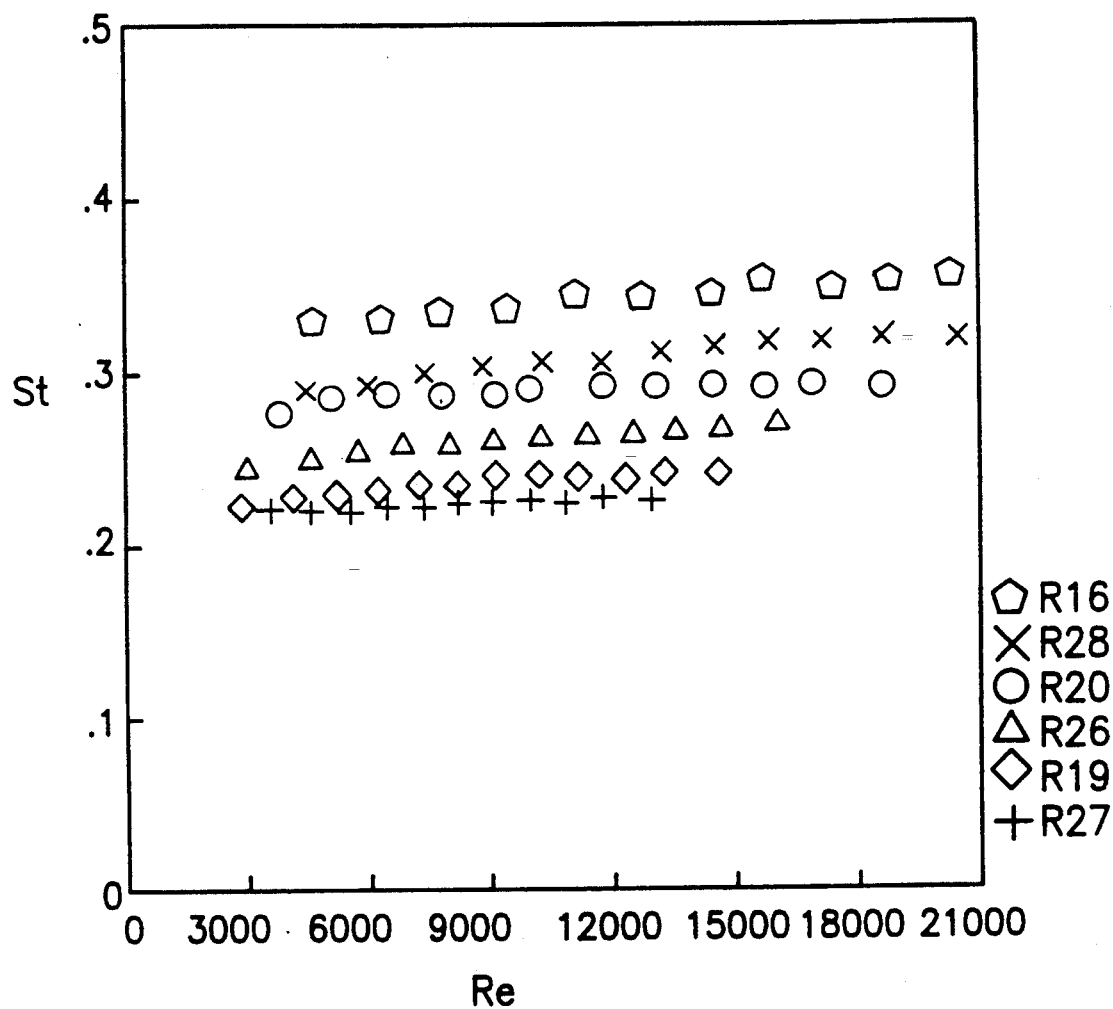
FIG. 9 is the distributions of St versus Re for Rings 16, 28, 20, 26, 19, and 27 whose gap ratios are about 0.5.
Figure 10:
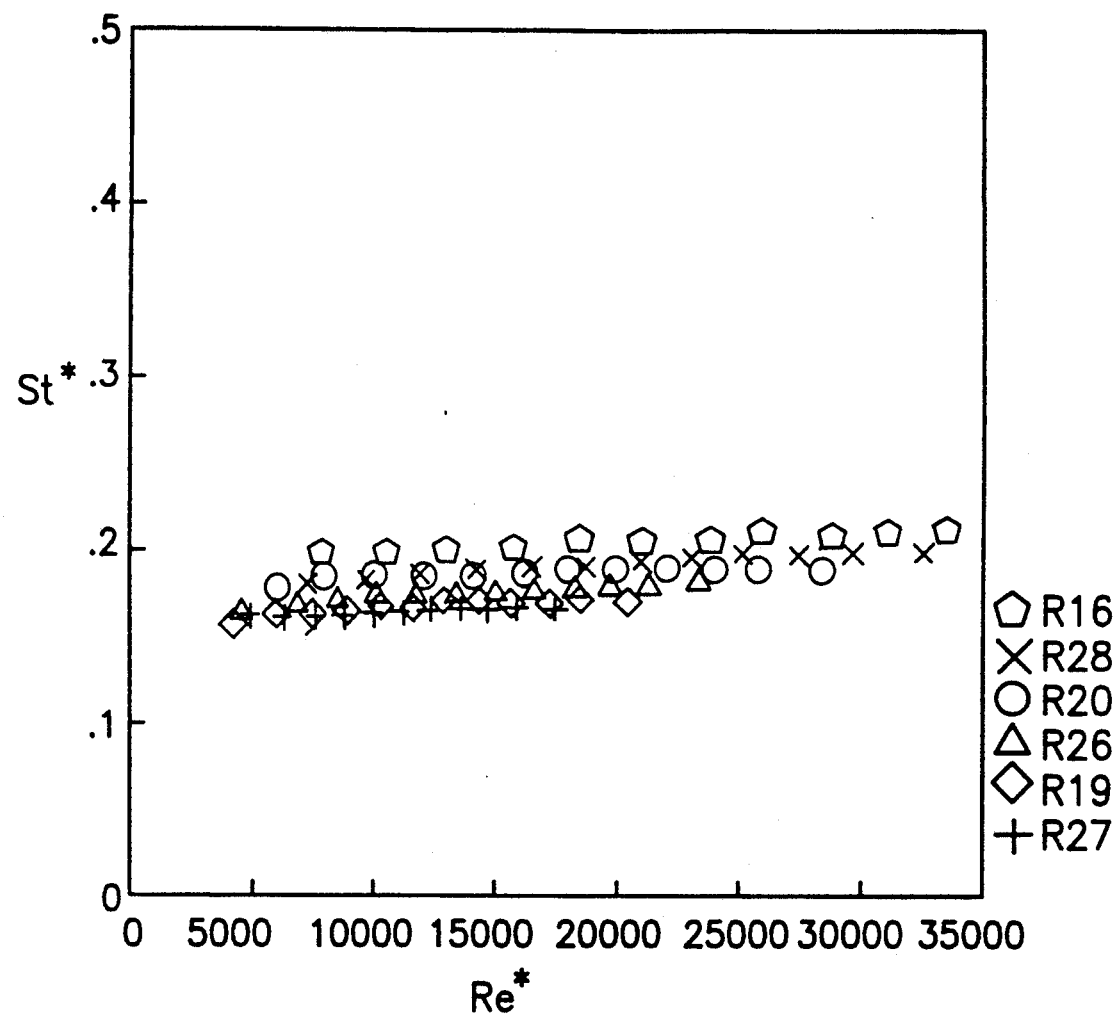
FIG. 10 is the distributions of $St^*$ versus $Re^*$ for Rings 16, 28, 20, 26, 19, and 27 whose gap ratios are about 0.5.

The vortex shedding frequencies, f, reduced from the microphone signals for the rings with gap ratios of about 0.5, are nondimensionalized by $U_o$ and W to form the Strouhal numbers, $St = f \cdot W/U_o$. The results of St versus the Reynolds number for the six cases of rings studied are shown in FIG. 9, where the Reynolds number is defined as $Re = U_o \cdot W/v$ and $v$ is the kinematic viscosity of the flowing in the pipe. The values of St obtained for each of the rings appear to be nearly a linear function of Re. Furthermore, a trend revealed by the graph is that the value of St increases as the slenderness ratio $\overline{D}/W$ decreases. Attempts were made to unify the data points presented in FIG. 9 into a single curve with various velocities and length scales other than $U_o$ and W. However, these attempts were not quite successful. The best results obtained are shown in FIG. 10, in which the data points of different rings appear to get much closer than those seen in FIG. 9. In FIG. 10, St* is defined as and Re* is defined as $U^* \cdot W/v$, where $U^* = U_o/(1-BR)$. Please refer to Table 1 for the value of BR corresponding to each of the rings studied. For later descriptions, W and U* are then taken as the characteristic length and velocity respectively, to normalize the flow quantities presented.

Figure 11:
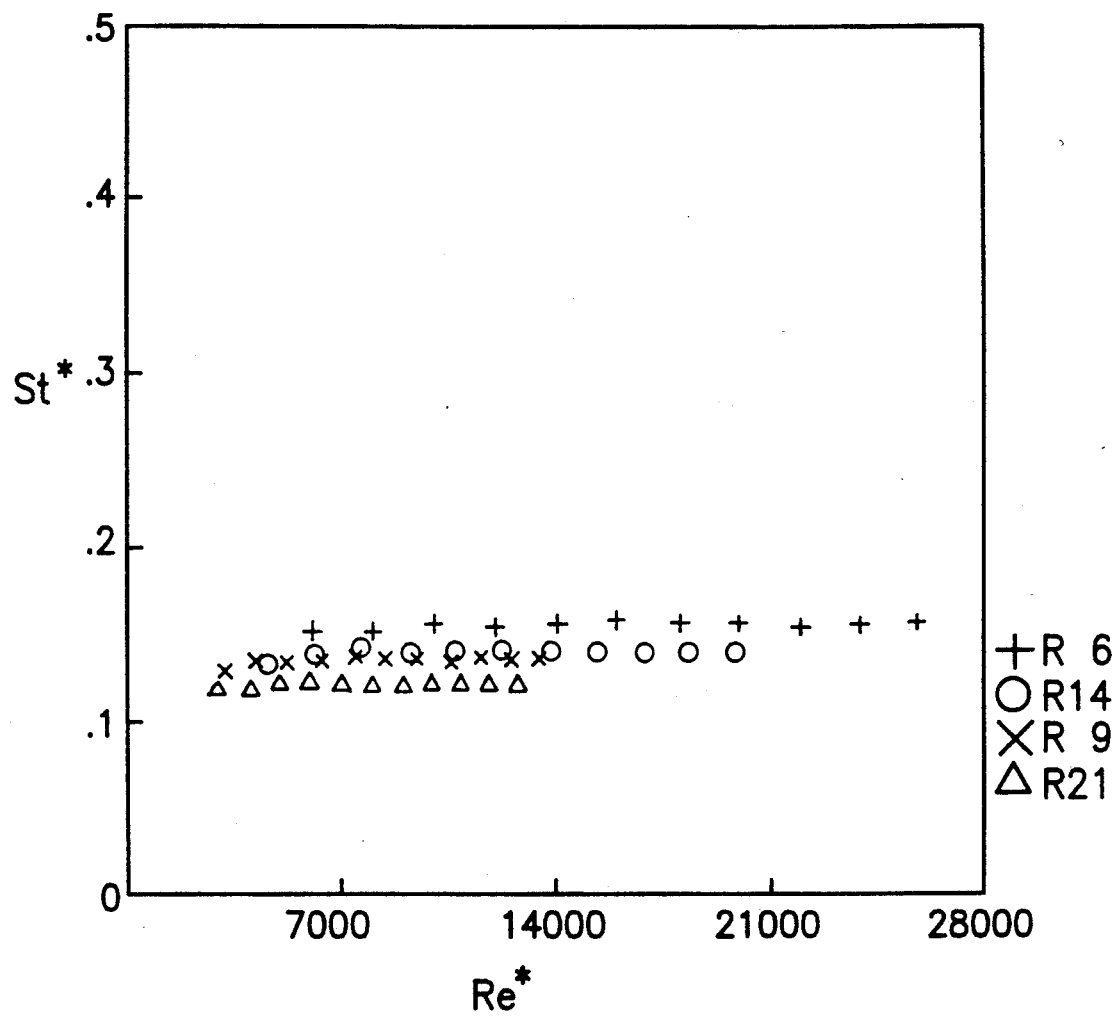
FIG. 11 is the distributions of $St^*$ versus $Re^*$ for Rings 6, 9, 14, and 21 whose gap ratios are greater than 1.

In the cases of the rings whose gap ratios are larger than 1.0, for instances, Rings 6,9,14 and 21 as shown in FIG. 11, the values of St* obtained appear to be lower than those corresponding to the cases shown in FIG. 10. For Ring 21 with G/W=3.09, the values of St* obtained in the range of the Reynolds numbers studied are about 0.12, which are close to the Strouhal number of a ring in the free flow, [refer to M. Takamoto and K. Komiya, Bullettin-National Research Laboratory Metrology, 32(3), 125(1983)]. Hence, a comparison of FIG. 10 and FIG. 11 reveals a general trend that the value of St* decreases as G/W increases. In terms of these cases, the value of St* decreases from 0.2 to 0.12 as G/W increases from 0.5 to 3.09.

Figure 12:
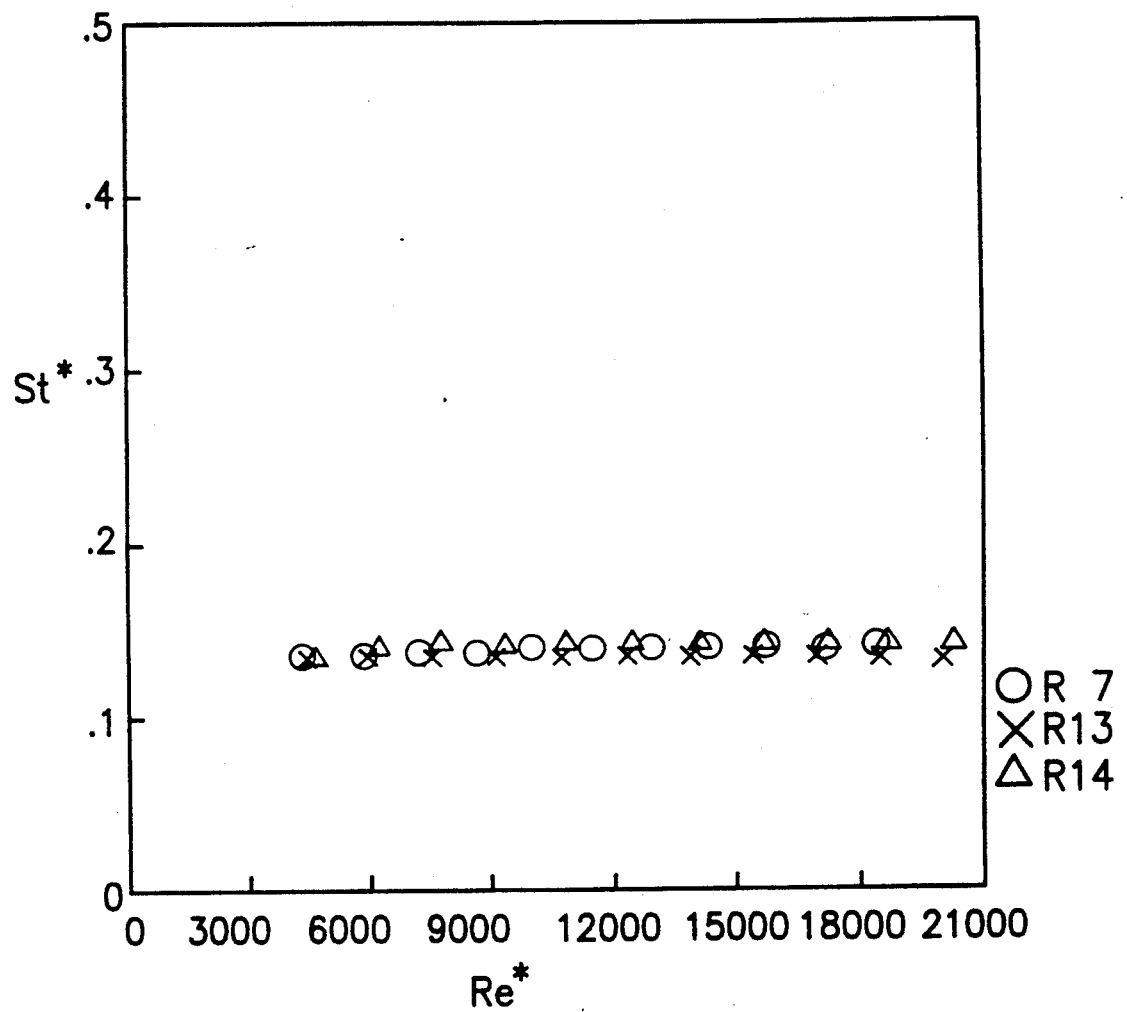
FIG. 12 is the distributions of $St^*$ versus $Re^*$ for Rings 7, 13, and 14 whose widths are about 15 mm.

It is interesting to point out that for the cases of rings whose gap ratios are greater than 1.0, the values of St* measured corresponding to the rings of the same width are about the same. This is illustrated in FIG. 12 for Rings 7, 13 and 14 whose widths are about 15 mm and gap ratios are 2.14, 1.37 and 1.04 respectively, and the values of St* measured collapse into a single linear curve. This seems to imply that the presence of the wall does not affect the non-dimensionalized vortex shedding frequency. However, it should be mentioned that the characteristic velocity U* in the expression of the Strouhal number, St*, is modified from $U_o$ to account for the blockage effect. A similarity of this flow behavior in the two-dimensional flow configuration is due to a flow over a circular cylinder near a flat plate (refer to Bearman, P. W. and Zdravkovich, M. M. "Flow around a Circular Cylinder near a Plane Boundary", J. F. M., 1978, Vol.89, Part 1, pp.33–47) that the Strouhal number of the circular cylinder measured, $St = f \cdot D/U_o$, where D denotes the diameter of the cylinder, remains unchanged for the ratio of the gap width to the diameter of the circular cylinder as low as 0.3. In the present flow, if the ring gets closer to the wall, for instance Ring 26 whose W=15 mm and G/W=0.5, the corresponding Strouhal number measured is distinctly different from the cases of Rings 7, 13 and 14, as shown in FIG. 10 and FIG. 12 for comparison. This difference strongly implies that the processes of vortex shedding corresponding to the case of Ring 26 and in the cases of Rings 7,13 and 14 can be very different. Flow visualization results for G/W=0.52 shown in FIG. 8c, i.e. the case of Ring 19, indicates that vortex shedding from the outer edge of the ring is suppressed immediately downstream while the vortical structures developed from the inner edge of the ring convect along the surface of the pipe wall for a considerable distance downstream.

B. Optimal streamwise location for wall pressure measurement

As the gap ratio of the ring decreases, the intensity of pressure fluctuations measured on the wall increases. Hence, to find the optimal location for wall pressure measurement our efforts are focused on the cases of Rings 16, 28, 20, 26, 19 and 27 whose gap ratios are about 0.5 while their slenderness ratios increase from 5 to 10.83.

Figure 13:
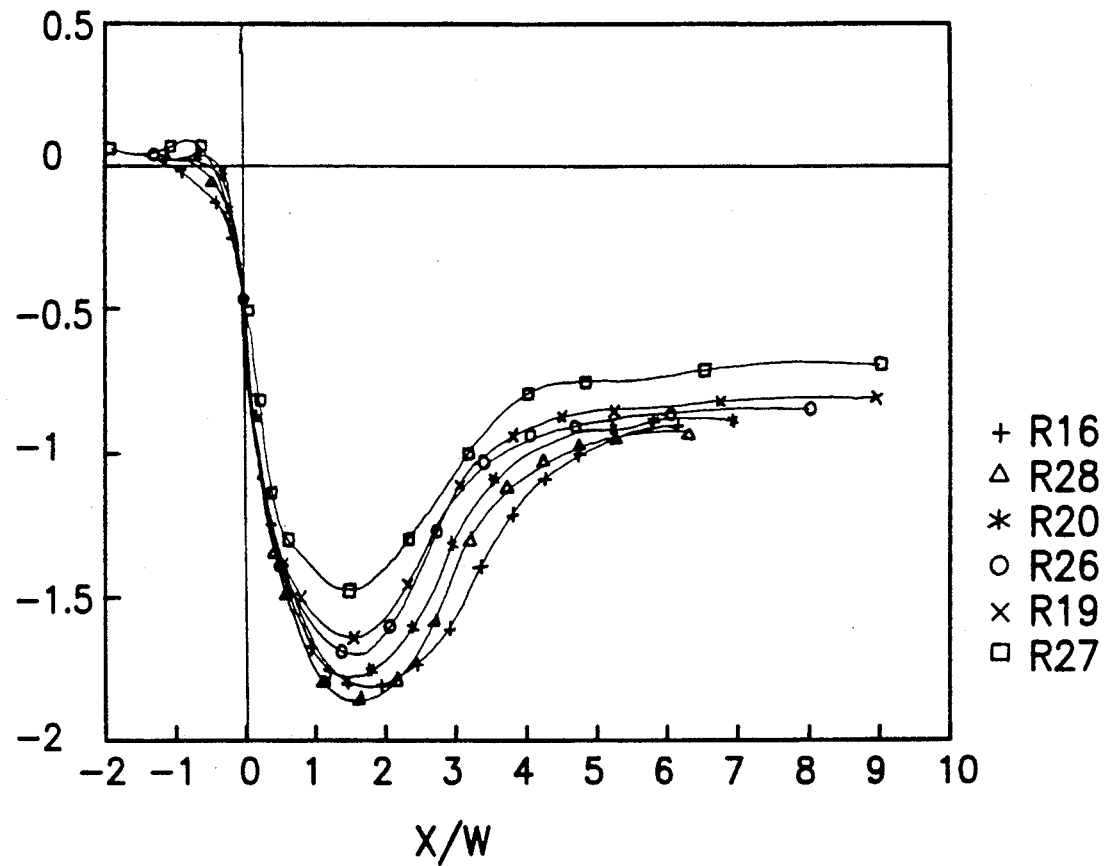
FIG. 13 is the distributions of C versus $X/W$ for Rings 16, 28, 20, 26, 19, and 27 obtained at $U_o=5.5$ m/s in the wind tunnel.

Streamwise variations of time-mean wall pressure distributions obtained for these cases are shown in FIG. 13. In this figure, the vertical axis is indicated with the scale of $$C_p = \frac{P - P_o}{\frac{1}{2} \cdot \rho \cdot U^{*2}} \quad (5)$$

where $P_o$ is the reference pressure measured at the inlet of the test section, 26 cm upstream of the ring, and P is the local time-mean pressure measured on the wall. As can be seen, the pressure coefficients, $C_p$, obtained are negative values in the region downstream of the ring measured. The locations of the minimum wall pressure measured for the six cases studied appear to fall in a streamwise region of X/W=1.5 to 2, whose absolute magnitude is within a range between 1.5 and 1.86, in a trend that increases with the blockage ratio.

Figure 14A:
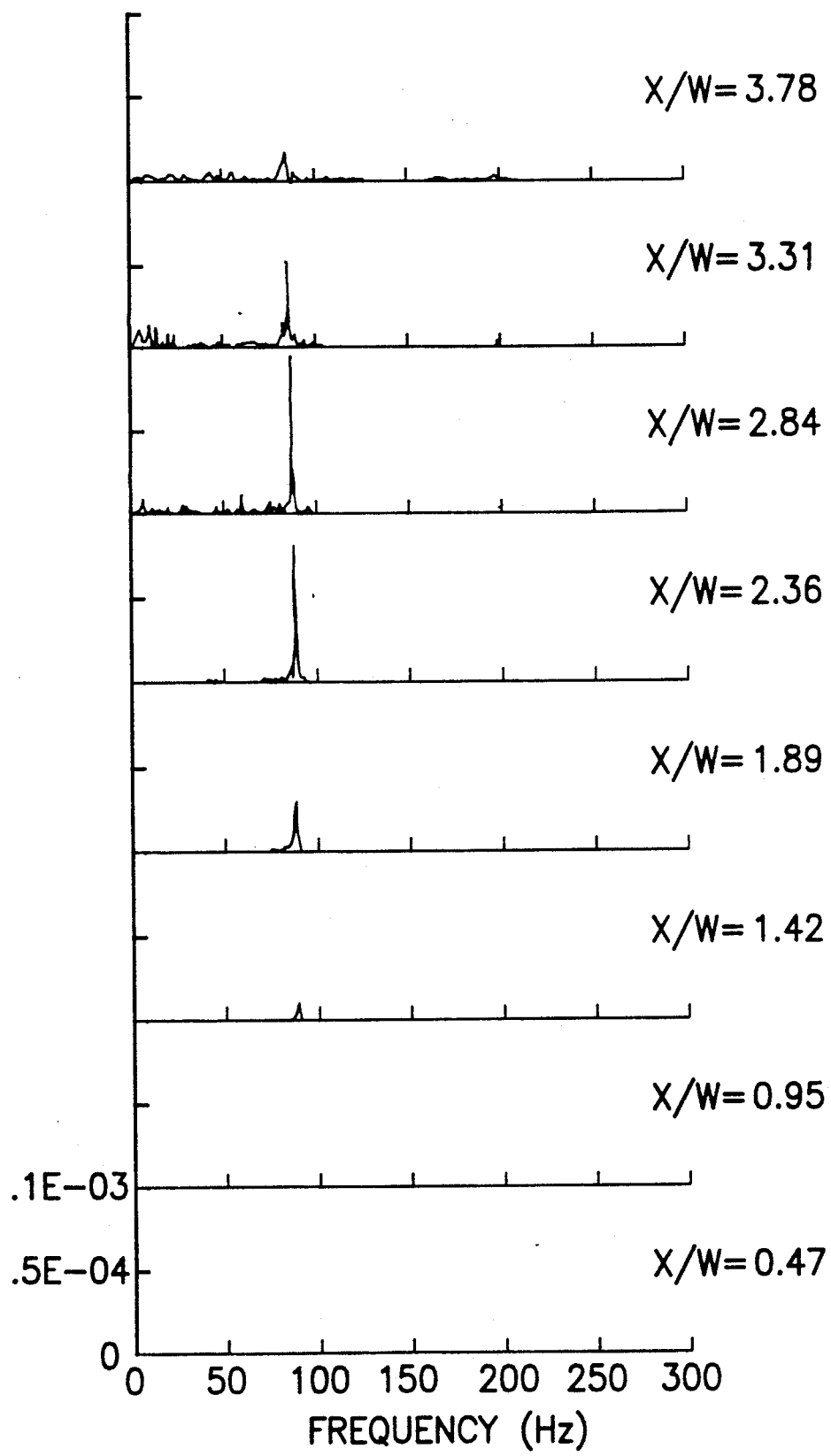
FIG. 14a is the frequency spectrum of the wall pressure fluctuation obtained in the region with $X/W=0$ to 5, Ring 16 at $Re^*=1.3\times10^4$.
Figure 14B:
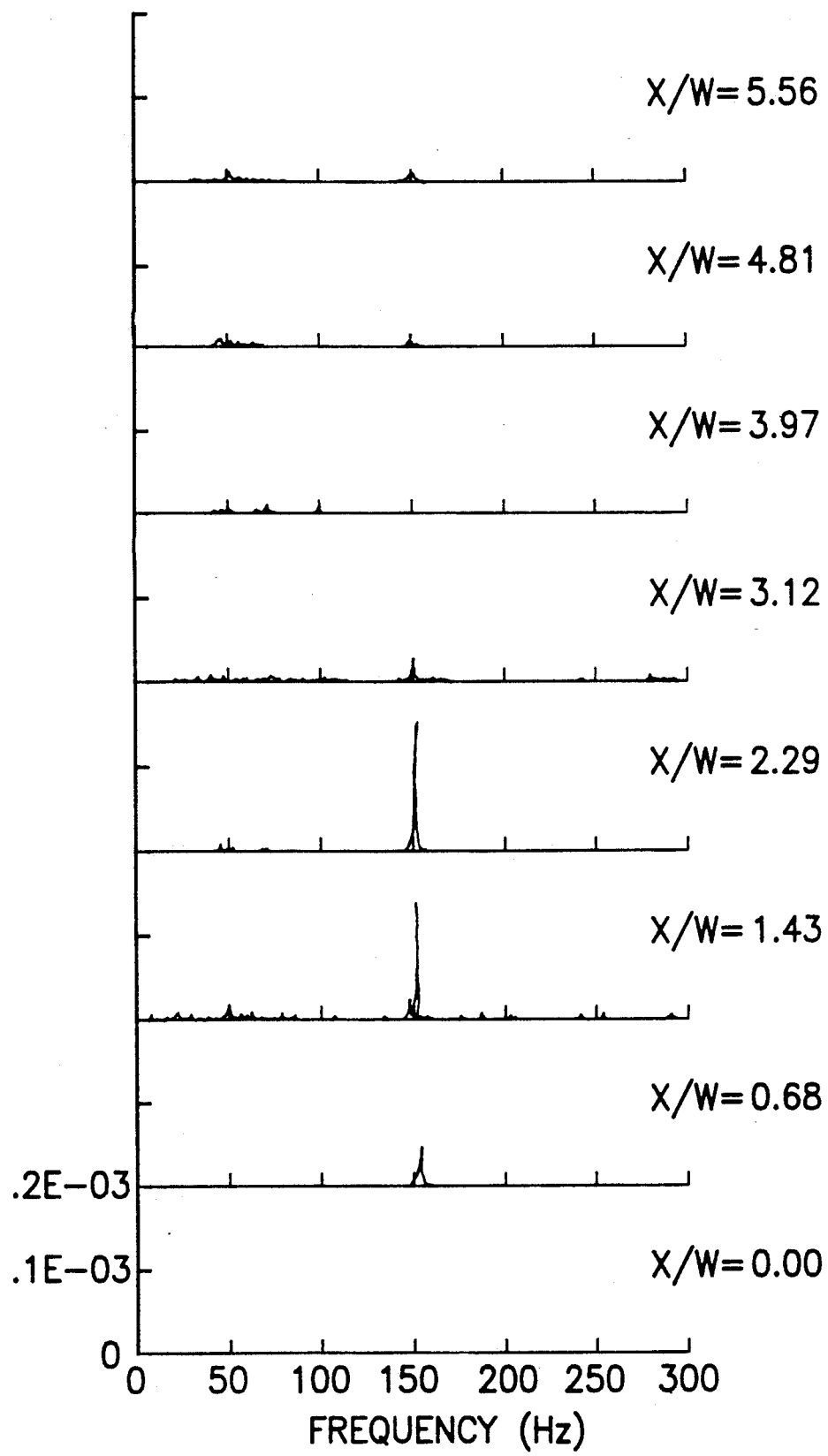
FIG. 14b is the frequency spectra of the wall pressure fluctuations obtained in the region with $X/W=0$ to 5, Ring 27 at $Re^*=1.26\times10^4$.

Results of spectral analysis for the wall pressure fluctuations measured by a condensed microphone in a streamwise region over X/W=0 to 5 for Rings 16 and 27 are presented in FIG. 14a and FIG. 14b respectively to indicate the quality of the signals obtained. It is clear that the microphone employed has a poor response to the pressure fluctuations at frequencies lower than 10 Hz. Thus, for spectra in this range the amplitudes of the frequency components appear to be almost negligible. From these graphs, one can see that in a streamwise region of X/W=2 to 3 the amplitude of the vortex shedding frequency component measured generally reaches the maximum value. Similar findings are also noted for Rings 28, 20, 26 and 19, whose gap ratios are about the same and slenderness ratios fall between those of Rings 16 and 27. This observation strongly suggests that the streamwise region of X/W=2 to 3 is ideal for installation of the pressure sensor.

Figure 15:
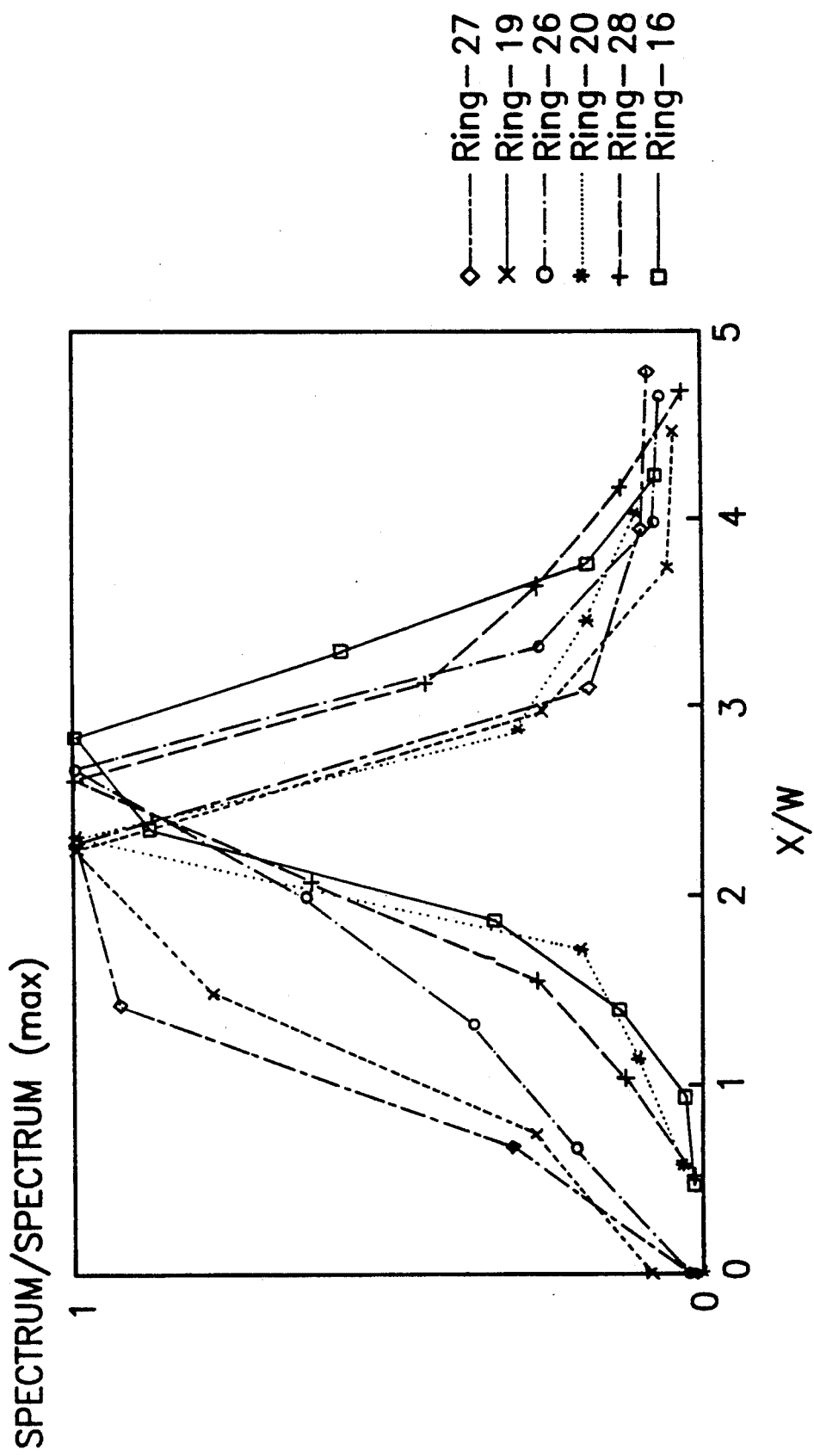
FIG. 15 is the streamwise variations of the normalized spectral intensity at the vortex shedding frequency, reduced from the microphone signals obtained in the region with $X/W=0$ to 5, for Rings 16, 28, 20, 26, 19, and 27.

Based on the spectral results of the microphone signals measured, the streamwise variations of the spectral intensity at the vortex shedding frequency for the six rings studied are shown in FIG. 15. The data for the spectral intensity at f in this figure are plotted in the normalized values, namely normalized by the maximum value of the corresponding ring measured. The appearance of this figure confirms the foregoing statement that the optimal location for installation of the pressure sensor falls in the region of X/W=2 to 3.

Figure 16:
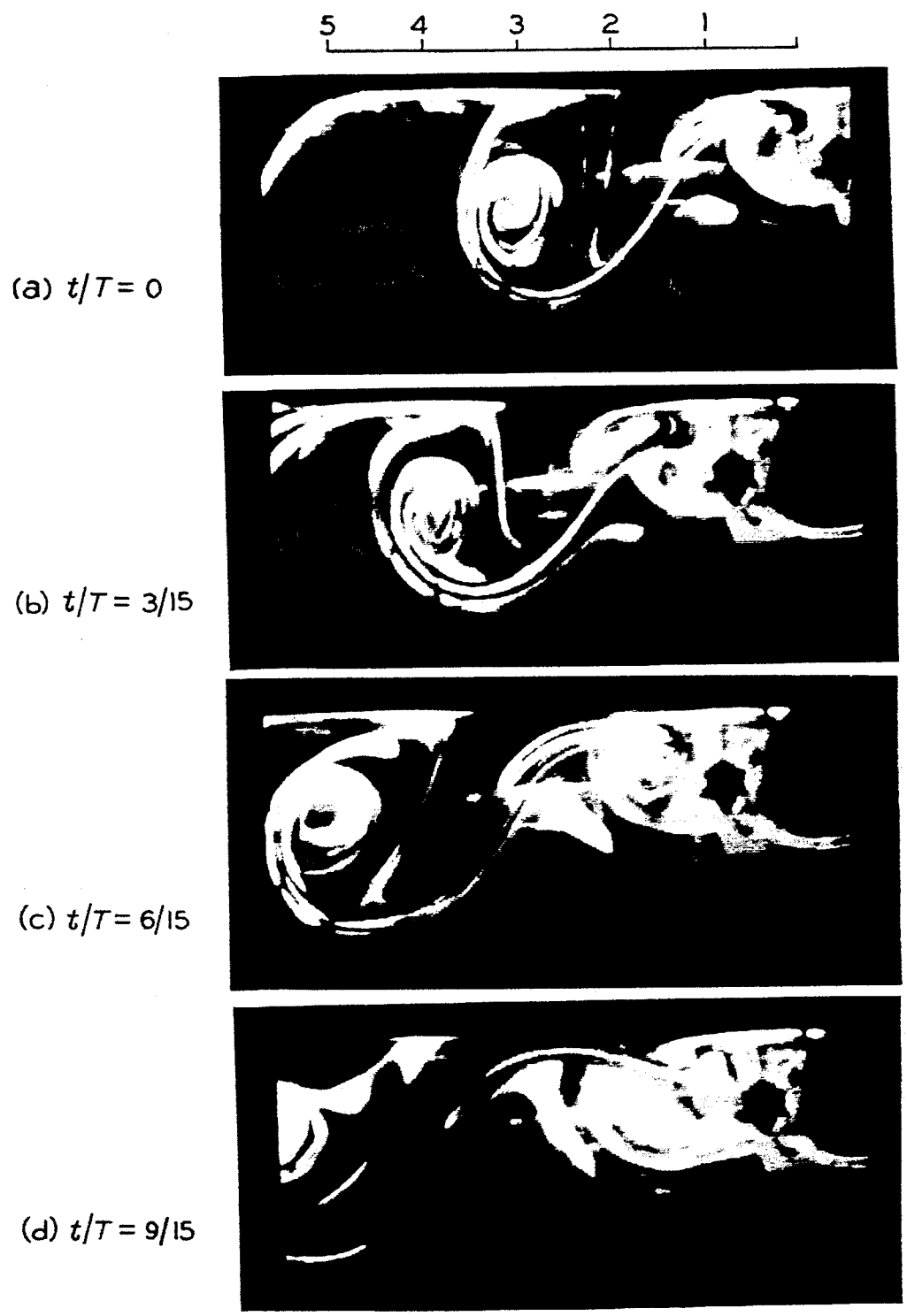
FIG. 16 is a series of flow visualization photographs obtained for Ring 19 in the water tunnel facility at $Re^*=375$, the time interval between each photograph shown is 0.3s, and T denotes the time period of vortex shedding, which is about 1.5s.

Large intensity of pressure fluctuations measured on the wall in the streamwise region of X/W=2 to 3 is found to be associated with a physical process of repeated flow reattachment and detachment on the wall. This physical process is illustrated in FIG. 16 with a time-series of photographs taken for Ring 19 in the water tunnel. The time interval between two consecutive photographs is 0.3 second. It is estimated that the shedding period under such flow conditions, is about 1.5 seconds. As can be seen, at t=0 a vortical structure is developed in the gap flow. Apparently, this vortical structure induces the surrounding fluid to lift away from the wall in the region of X/W=2 to 3, further refer to the photographs of t=0.3 to 0.6 second. At a later instant, t=0.9 second, due to the development of a vortical structure in the opposite sense from the inner edge of the ring, the vortical structure developed earlier in the gap flow is suppressed. Consequently, the vortical structure developed from the inner edge of the ring induces the neighboring fluid toward the wall, resulting in a situation of flow reattachment in the region of X/W=2 to 3. This repeated process of detachment and reattachment of flow near the wall apparently is synchronized with the vortex shedding process. Thus, it is clear that the vortex shedding frequency component is embedded in the wall pressure signals measured.

C. Obtained the vortex shedding frequency by velocity measurement

Figure 17A:
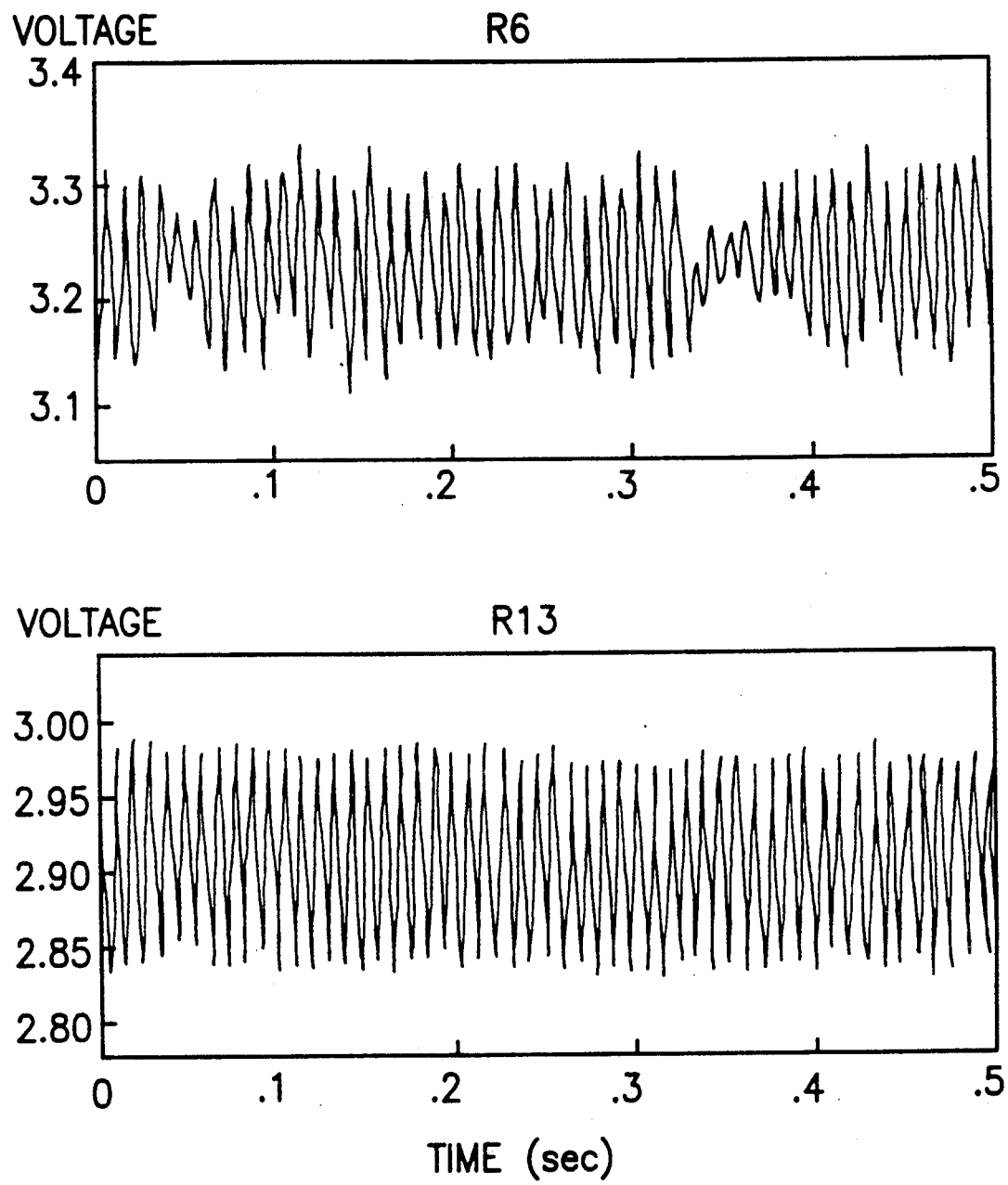
FIG. 17a shows typical segments of the raw velocity signals obtained at 4 cm downstream of the ring at the core of the pipe with Ring 6 at $Re^*=9.3\times10^3$ and Ring 13 at $Re^*=9.3\times10^3$.
Figure 17B:
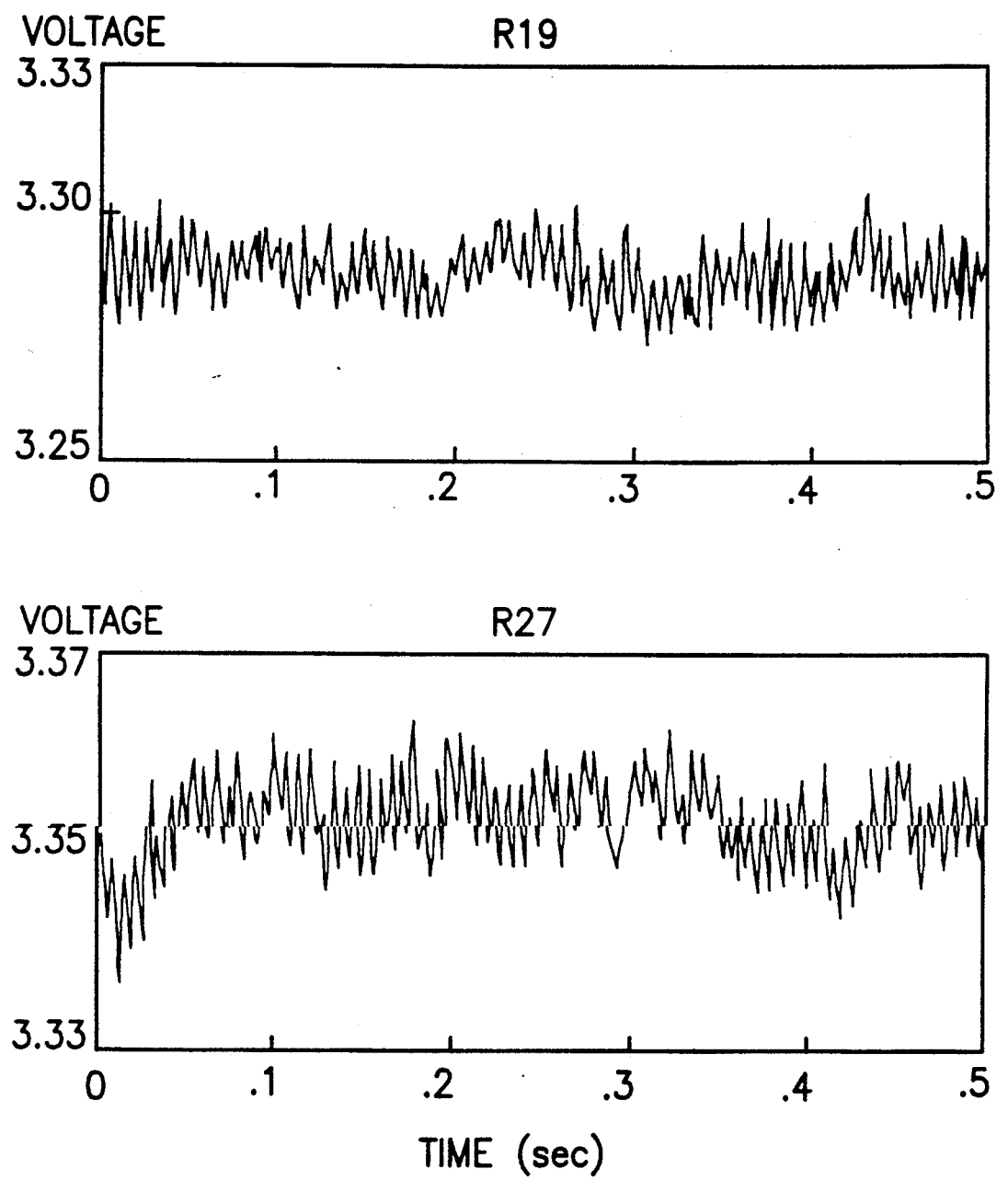

In addition to the foregoing method of obtaining th vortex shedding frequency from wall pressure measurement, one may follow the method reported by Takamoto and Komiya [refer to M. Takamoto and K. Komiya, Bullettin-National Research Laboratory Metrology, 32(3), 125(1983)] and Cousins et al. [refer to T. Cousins, A. J. T. Hayward, and R. Scott, Flow Measurement FLOMEKO, the 5th International IMEKO-Conference on Flow Measurement FLOMEKO, VDI BERICHTE 768, 151 (1989)]. to search for the appropriate sizes of rings that the vortex shedding frequency can be clearly detected by a velocity probe situated in the flow field. According to Takamoto and Komiya, the vortex shedding frequency of a ring-type vortex shedder can be obtained from the velocity signal measured at the core of the pipe. Hence, in the present experiment a normal hot-wire probe was fixed at 4 cm downstream of the ring, at the center of the pipe. It is shown in FIG. 17a that for Rings 6 and 13 whose gap ratios are larger than 1.0 and slenderness ratios are larger than 5.0, the velocity fluctuations measured appear to be dominated by the periodic variations at the vortex shedding frequency. On the other hand, for the cases of smaller gap ratios, as shown in FIG. 17b for Rings 19 and 27, the velocity fluctuations measured appear to have a significant amount of energy residing in the low frequency component in addition to the variations in the vortex shedding frequency component. This comparison substantiates the observation that the quality of the velocity signal presented in FIG. 17a is superior to the quality of the velocity signal presented in FIG. 17b as far as the vortex shedding frequency component is concerned.

Figure 18:
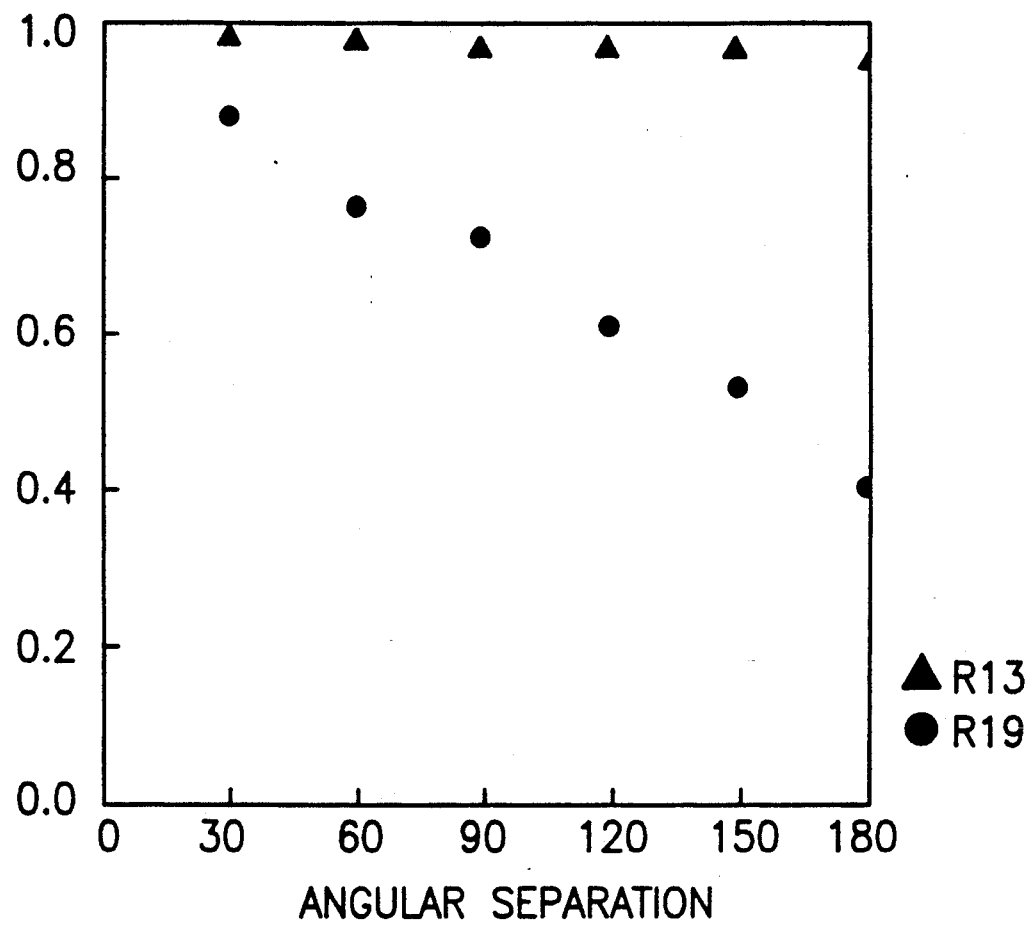
FIG. 18 is the distributions of spatial correlation coefficients versus the angular separations of two microphones obtained in the wind-tunnel experiments, for Ring 13 at $Re^*=1.1\times10^4$ and $X/W=2.05$ and Ring 19 at $Re^*=1.2\times10^4$ and $X/W=2.26$.

The characteristics of the shedding vortical structures were further studied by a spatial correlation technique with wall pressure measurements. Two microphones were employed to measure the pressure fluctuations on the wall at two circumferential positions in the same cross-sectional plane. The microphone signals were then band-passed by a filter built in a computer program with the lower and upper cut-off frequencies at f - 10 Hz and f + 10 Hz. The filtered signals were then reduced for correlation coefficient. Since the wall pressure fluctuations measured reflect the characteristics of the vortex shedding process, our motive behind these efforts is to examine the degree of three-dimensionality associated with the vortex shedding process. Results of the correlation coefficient versus the angular separation of the two microphones up to 180° for Rings 13 and 19 are shown in FIG. 18. A marked difference noted between these distributions is that for Ring 13 the correlation values remain near 1.0 throughout the range of angular separations studied while for Ring 19 the correlation value decreases to less than 0.4 at the angular separation of 180°. This finding for Ring 19 leads to a speculation that the three-dimensionality of the vortex shedding process could be associated with the appearance of low-frequency variations in the raw velocity signal seen in FIG. 17b. Bloor [refer to S. Bloor, J. Fluid Mech., 19, 290(1978)] held a similar viewpoint and suggested that the low-frequency component velocity fluctuation measured in the wake region of a two-dimensional circular cylinder at Reynolds numbers in the laminar-turbulent transition regime is associated with the three-dimensional characteristic of the vortex shedding process. However, the linkage between the three-dimensionality and the low-frequency variations in the vortex shedding process has not been further clarified to date. This feature is of interest from an academic point of view, and is certainly important to the application of vortex flowmeter design, so it deserves careful investigation in the future.

CONCLUDING REMARKS

Results obtained in the present experiment suggest guidelines for designing the ring-type vortex flowmeter that can be considered in two directions.

(1) One may employ the ring-type bluff bodies with gap ratios of about 0.5 and slenderness ratios higher than 5 to be the vortex shedders for the flowmeter. The outstanding feature of this design is that the vortex shedding frequency can be obtained from the wall pressure measurement. The optimal streamwise location for installation of the pressure sensor is suggested to be in the region of X/W=2 to 3.

(2) One may also employ the ring-type bluff bodies with gap ratios higher than 1 and slenderness ratios higher than 5 as the vortex shedders. In this design, the vortex shedding frequency is suggested to be reduced from the velocity signal obtained at the core of the pipe flow.

As described above, a configuration of a ring-type bluff body situated in a circular pipe is suggested as a design for a vortex flowmeter. The nondimensionalized geometrical parameters to the flow are the gap ratio, G/W about 0.5, and the slenderness ratio, $\overline{D}/W$ higher than 5, where G denotes the gap width between the outer edge of the ring and the pipe wall, W denotes the width of the ring and $\overline{D}$ denotes the mean diameter of the ring. The outstanding feature of this design is that the vortex shedding frequency can be obtained from the wall pressure measurement. The optimal streamwise location for installation of the pressure sensor is suggested to be in the region of X/W=2 to 3. The vortex shedding frequencies are nondimensionalized and the results obtained appear to be nearly a linear function of Reynolds Numbers. Consequently, the Reynolds Numbers can be obtained by this linear relationship and can be transformed to flow speed and flow rate.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

TABLE 1

Geometrical parameters, G/W, $\overline{D}/W$, and BR corresponding to 28 rings employed in this work.

| | $\overline{D}/W$ | G/W | BR | Ring No. |
|---|---|---|---|---|
| Ring - 27 | 10.63 | 0.52 | 0.27 | R27 |
| Ring - 11 | 9.29 | 5.88 | 0.08 | R11 |
| Ring - 10 | 9.12 | 3.61 | 0.12 | R10 |
| Ring - 15 | 9.00 | 2.50 | 0.16 | R15 |
| Ring - 9 | 9.09 | 1.83 | 0.19 | R9 |
| Ring - 18 | 9.18 | 1.03 | 0.24 | R18 |
| Ring - 19 | 9.20 | 0.52 | 0.29 | R19 |
| Ring - 26 | 8.04 | 0.50 | 0.32 | R26 |
| Ring - 14 | 7.10 | 1.04 | 0.27 | R14 |
| Ring - 23 | 6.10 | 4.10 | 0.10 | R23 |
| Ring - 21 | 6.65 | 3.09 | 0.14 | R21 |
| Ring - 13 | 6.49 | 1.37 | 0.25 | R13 |
| Ring - 20 | 6.63 | 0.53 | 0.35 | R20 |
| Ring - 28 | 5.82 | 0.52 | 0.38 | R28 |
| Ring - 17 | 5.62 | 5.57 | 0.07 | R17 |
| Ring - 16 | 5.03 | 0.53 | 0.40 | R16 |
| Ring - 12 | 4.96 | 3.40 | 0.12 | R12 |
| Ring - 7 | 4.99 | 2.14 | 0.19 | R7 |
| Ring - 6 | 4.98 | 1.09 | 0.30 | R6 |
| Ring - 8 | 2.00 | 2.25 | 0.14 | R8 |
| Ring - 4 | 2.07 | 1.75 | 0.19 | R4 |
| Ring - 5 | 2.08 | 1.10 | 0.30 | R5 |
| Ring - 3 | 2.03 | 0.76 | 0.39 | R3 |
| Ring - 1 | 2.07 | 0.56 | 0.47 | R1 |
| Ring - 22 | 2.00 | 0.38 | 0.56 | R22 |
| Ring - 25 | 4.00 | 4.32 | 0.09 | R25 |
| Ring - 24 | 4.00 | 1.25 | 0.28 | R24 |
| Ring - 2 | 3.17 | 1.04 | 0.32 | R2 |

BR: geometrical blockage ratio

What is claimed is:

1. A method for measuring flow speed and flow rate in a pipe, comprising the following steps of:
   (a) providing an axisymmetric bluff body disposed within the pipe, having a ring facing incoming flow for inducing a vortex shedding frequency, said ring being bevelled at an acute angle at the inner and outer edges of said ring;
   (b) recording a wall pressure signal induced by said vortex shedding frequency;
   (c) obtaining said vortex shedding frequency from said wall pressure signal; and
   (d) obtaining a flow speed and flow rate from said vortex shedding frequency.

2. A method for measuring flow speed and flow rate in a pipe as claimed in claim 1, wherein said step (c) is performed by frequency spectral analysis of said wall pressure signal.

3. A method for measuring flow speed and flow rate in a pipe as claimed in claim 1, wherein the geometrical parameter G/W of said ring is about 0.5, where $G=(D_p-D_o)/2$, $W=(D_o-D_i)/2$, $D_o$ and $D_i$ denoting the diameters respectively corresponding to the outer and inner edges of said ring, $D_p$ denoting the diameter of the pipe.

4. A method for measuring flow speed and flow rate in a pipe as claimed in claim 3, wherein said step (c) is performed by frequency spectral analysis of said wall pressure signal.

5. A method for measuring flow speed and flow rate in a pipe as claimed in claim 1, wherein the geometrical parameter $\overline{D}/W$ of said ring is larger than 5, where $\overline{D}=(D_p+D_o)/2$, $W=(D_o-D_i)/2$, $D_o$ and $D_i$ denoting the diameters respectively corresponding to the outer and inner edges of said ring, $D_p$ denoting the diameter of the pipe.

6. A method for measuring flow speed and flow rate in a pipe as claimed in claim 5, wherein said step (c) is performed by frequency spectral analysis of said wall pressure signal.

7. A method for measuring flow speed and flow rate in a pipe as claimed in claim 1, wherein said wall pressure signal is recorded at a position downstream from said bluff body in the region that X/W ranges from about 2 to 3, where $W=(D_o-D_i)/2$, $D_o$ and $D_i$ denoting the diameters respectively corresponding to the outer and inner edges of said ring, X denoting the axial distance from the leading surface of said ring.

8. A method for measuring flow speed and flow rate in a pipe as claimed in claim 7, wherein said step (c) is performed by frequency spectral analysis of said wall pressure signal.

9. A method for measuring flow speed and flow rate in a pipe as claimed in claim 1, wherein the geometrical parameter G/W of said ring is about 0.5, and the geometrical parameter of $\overline{D}/W$ of said ring is larger than 5, where $G=(D_p-D_o)/2$, $\overline{D}=(D_p+D_o)/2$, $W=(D_o-D_i)/2$, $D_o$ and $D_i$ denoting the diameters respectively corresponding to the outer and inner edges of said ring, $D_p$ denoting the diameter of the pipe.

10. A method for measuring flow speed and flow rate in a pipe as claimed in claim 9, wherein said step (c) is performed by frequency spectral analysis of said wall pressure signal.

11. A method for measuring flow speed and flow rate in a pipe as claimed in claim 1, wherein said wall pressure signal is recorded at a position downstream from said bluff body in the region that X/W ranges from about 2 to 3, the geometrical parameter G/W of said ring is about 0.5, and the geometrical parameter $\overline{D}/W$ of said ring is larger than 5, where $G=(D_p-D_o)/2$, $\overline{D}=(D_p+D_o)/2$, $W=(D_o-D_i)/2$, $D_o$ and $D_i$ denoting the diameters respectively corresponding to the outer and inner edges of said ring, $D_p$ denoting the diameter of the pipe, X denoting the axial distance from the leading surface of said ring.

12. A method for measuring flow speed and flow rate in a pipe as claimed in claim 11, wherein said step (c) is performed by frequency spectral analysis of said wall pressure signal.

13. A vortex flowmeter for measuring flow speed and flow rate in a pipe, comprising:
an axisymmetric bluff body disposed within the pipe, having a ring facing incoming flow for inducing a vortex shedding frequency, said ring being beveled at an acute angle at the inner and out edges of said ring;
means for recording a wall pressure signal induced by said vortex shedding frequency;
means for obtaining said vortex shedding frequency from said wall pressure signal; and
means for obtaining flow speed and flow rate from said vortex shedding frequency.

14. A vortex flowmeter for measuring flow speed and flow rate in a pipe as claimed in claim 13, wherein said means for recording the wall pressure signal is mounted on the inner wall of the pipe at a position downstream from said bluff body in the region that X/W ranges from about 2 to 3, where $W=(D_o-D_i)/2$, $D_o$ and $D_i$ denoting the diameters respectively corresponding to the outer and inner edges of said ring, X denoting the axial distance from the leading surface of said ring.

15. A vortex flowmeter for measuring flow speed and flow rate in a pipe as claim in claim 13, wherein the geometrical parameter G/W of said ring is about 0.5, where $G=(D_p-D_o)/2$, $W=(D_o-D_i)/2$, $D_o$ and $D_i$ denoting the diameters respectively corresponding to the outer and inner edges f said ring, $D_p$ denoting the diameter of the pipe.

16. A vortex flowmeter for measuring flow speed and flow rate in a pipe as claimed in claim 13, wherein, the geometrical parameter $\overline{D}/W$ of said ring is larger than 5, where $\overline{D}=(D_p+D_o)/2$, $W=(D_o-D_i)/2$, $D_o$ and $D_i$ denoting the diameters respectively corresponding to the outer and inner edges of said ring, $D_p$ denoting the diameter of the pipe.

17. A vortex flowmeter for measuring flow speed and flow rate in a pipe as claimed in claim 13, wherein the geometrical parameter G/W of said ring is about 0.5, and the geometrical parameter $\overline{D}/W$ of said ring is larger than 5, where $G=(D_p-D_o)/2$, $\overline{D}=(D_p+D_o)/2$, $W=(D_o-D_i)/2$, $D_o$ and $D_i$ denoting the diameters respectively corresponding to the outer and inner edges of said ring, $D_p$ denoting the diameter of the pipe.

18. A vortex flowmeter for measuring flow speed and flow rate in a pipe as claimed in claim 13, wherein said means for recording the wall pressure signal is mounted on the inner wall of the pipe at a position downstream from said bluff body in the region that X/W ranges from about 2 to 3, the geometrical parameter G/W of said ring is about 0.5, and the geometrical parameter $\overline{D}/W$ of said ring is larger than 5, where $G=(D_p-D_o)/2$, $\overline{D}=(D_p+D_o)/2$, $W=(d_o-D_i)/2$, $D_o$ and $D_i$ denoting the diameters respectively corresponding to the outer and inner edges of said ring, $D_p$ denoting the diameter of the pipe, X denoting the axial distance from the leading surface of said ring.

* * * * *